United States Patent
Hudson

(10) Patent No.: US 11,649,663 B2
(45) Date of Patent: May 16, 2023

(54) POSITION SENSING DEVICE FOR SENSING AN UPPER LIMIT POSITION AND A LOWER LIMIT POSITION OF A HOISTING LINE

(71) Applicant: Brinsea Products Limited, Weston Super Mare (GB)

(72) Inventor: Trevor John James Hudson, Weston Super Mare (GB)

(73) Assignee: Brinsea Products Limited

( * ) Notice: Subject to any disclaimer, the term of this patent is extended or adjusted under 35 U.S.C. 154(b) by 827 days.

(21) Appl. No.: 16/597,009

(22) Filed: Oct. 9, 2019

(65) Prior Publication Data
US 2020/0115946 A1 Apr. 16, 2020

(30) Foreign Application Priority Data
Oct. 16, 2018 (GB) ...................................... 1816849

(51) Int. Cl.
| | |
|---|---|
| *E05F 15/40* | (2015.01) |
| *E05F 15/686* | (2015.01) |
| *B66D 1/56* | (2006.01) |
| *A01K 1/00* | (2006.01) |

(52) U.S. Cl.
CPC ............ *E05F 15/40* (2015.01); *A01K 1/0017* (2013.01); *B66D 1/56* (2013.01); *E05F 15/686* (2015.01); *E05Y 2400/44* (2013.01); *E05Y 2900/602* (2013.01)

(58) Field of Classification Search
CPC ....... E05F 15/40; E05F 15/686; A01K 1/0017
See application file for complete search history.

(56) References Cited

U.S. PATENT DOCUMENTS

| | | | |
|---|---|---|---|
| 4,231,191 A | | 11/1980 | Ellmore |
| 6,691,463 B1 * | | 2/2004 | Richmond |
| 2002/0184824 A1 * | | 12/2002 | McCartney et al. |
| 2008/0127560 A1 * | | 6/2008 | Harvey |
| 2008/0245484 A1 * | | 10/2008 | Tillman |
| 2020/0018110 A1 * | | 1/2020 | Lindley et al. |

FOREIGN PATENT DOCUMENTS

| | | |
|---|---|---|
| DE | 2741538 | 3/1979 |
| DE | 3632290 | 4/1988 |
| WO | 1999021412 | 5/1999 |

* cited by examiner

*Primary Examiner* — Daniel P Cahn
*Assistant Examiner* — Patrick B. Ponciano
(74) *Attorney, Agent, or Firm* — Mercedes V. O'Connor; Rockman Videbeck & O'Connor

(57) ABSTRACT

A position sensing device for sensing an upper limit position and a lower limit position of a hoisting line for raising and lowering a door leaf of an animal enclosure, the position sensing device comprising a hoisting line pathway for a hoisting line to raise and lower a door leaf of an animal enclosure, an actuator arm moveable between a first position and a second position, and a proximity switch having a first state corresponding to the actuator arm being in the first position and a second state corresponding to the actuator arm being in the second position.

16 Claims, 5 Drawing Sheets

POSITION SENSING DEVICE FOR SENSING AN UPPER LIMIT POSITION AND A LOWER LIMIT POSITION OF A HOISTING LINE

CROSS-REFERENCE TO RELATED APPLICATION(S)

This application claims priority to UK Patent Application No. 1816849.2, filed Oct. 16, 2018, to the extent allowed by law and the contents of which are incorporated herein by reference in their entireties.

TECHNICAL FIELD

The present invention relates to a position sensing device for sensing an upper limit position and a lower limit position of a hoisting line, a hoisting arrangement comprising the position sensing device, an animal enclosure incorporating the hoisting arrangement and a method of sensing upper and lower limit positions of a hoisting line using a hoisting arrangement.

BACKGROUND

In the field of animal enclosures, there is a need to reliably and repeatedly open and close a door covering an entrance or exit to the animal enclosure. Such doors are typically of the form of a substantially planar door leaf suspended between runners provided on opposing edges of the door leaf. The door leaf has one end of a hoisting line (e.g. cord, string, rope, chain, belt, etc.) attached to its upper edge. The other end of the hoisting line is attached to, and wound around, a drum. Rotation of the drum therefore causes the hoisting line to be either wound onto or unwound from the drum so as to raise or lower the door leaf between upper and lower limit positions.

In previously-considered arrangements the upper and lower limit positions of the door leaf may be detected by first and second position detectors corresponding to the respective positions.

However, it is costly, inconvenient and technically complex to install two sensors or switches in an animal enclosure door.

The present invention aims to overcome some of the problems outlined above with respect to the prior art. While the present invention was developed in attempting to improve animal enclosures specifically, it is appreciated that the invention may be applied to any technical area involving the raising and lowering of suspended loads.

SUMMARY

This disclosure relates generally to a position sensing device. One implementation of the teachings herein is a position sensing device for sensing an upper limit position and a lower limit position of a hoisting line for raising and lowering a door leaf of an animal enclosure, the position sensing device including a hoisting line pathway for a hoisting line to raise and lower a door leaf of an animal enclosure; an actuator arm moveable between a first position and a second position, wherein the actuator arm is biased to the first position; and a proximity switch having a first state corresponding to the actuator arm being in the first position and a second state corresponding to the actuator arm being in the second position, wherein the actuator arm is configured to cooperate with a hoisting line received along the hoisting line pathway such that when the hoisting line is in an intermediate position between the lower limit position and the upper limit position and is under tension corresponding to a suspended load, it bears against a portion of the actuator arm to move the actuator arm to the second position, wherein the actuator arm is configured so that when tension corresponding to a suspended load is relieved from the hoisting line in its lower limit position, the actuator arm moves under bias to the first position; and wherein the actuator arm is configured to cooperate with an engagement portion on the hoisting line as the hoisting line rises towards its upper limit position to move the actuator arm into the first position when the hoisting line is in its upper limit position.

These and other aspects of the present disclosure are disclosed in the following detailed description of the embodiments, the appended claims and the accompanying figures.

BRIEF DESCRIPTION OF THE DRAWINGS

The various features, advantages, and other uses of the apparatus will become more apparent by referring to the following detailed description and drawings, wherein like reference numerals refer to like parts throughout the several views. It is emphasized that, according to common practice, the various features of the drawings are not to-scale. On the contrary, the dimensions of the various features are arbitrarily expanded or reduced for clarity.

DETAILED DESCRIPTION

Figure 1:
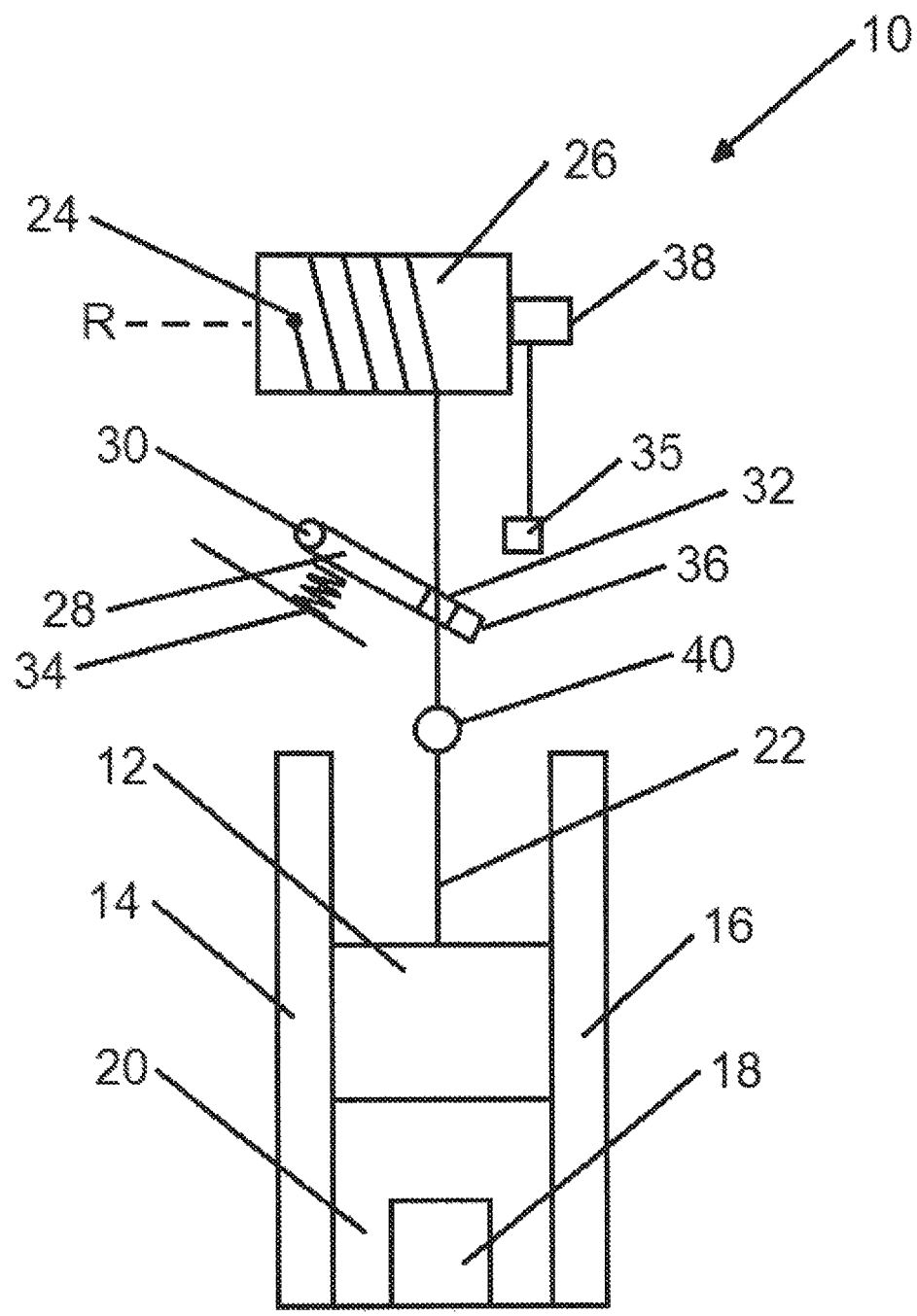
FIG. 1 schematically shows a front view of a hoisting arrangement according to an embodiment of the invention.

FIG. 1 schematically shows a front view of a hoisting arrangement 10 according to an embodiment of the invention. The hoisting arrangement 10 comprises a generally planar door leaf 12. The door leaf 12 is suspended between a first runner 14 and a second runner 16. The runners 14, 16 partially enclose respective first and second lateral edges of the door leaf 12 to prevent movement orthogonal to the plane of the door leaf 12 but to permit linear movement of the door leaf in up/down direction in the plane of the door leaf 12, as is well known in the art.

An opening 18 is provided in a wall 20 of an animal enclosure. The opening 18 is appropriately sized to allow passage of animals to be held in the animal enclosure through the opening 18. In the example shown in FIG. 1 the opening 18 does not extend the entire width of the wall 20 between the runners 14, 16, but in some example the opening 18 may extend the full width of the wall 20 between the runners 14, 16.

The runners 14, 16 and door leaf 12 are arranged such that the door leaf 12 blocks the opening 18 in a lower limit position of the door leaf 12, corresponding to the door leaf 12 engaging a lower support surface, for example a lower frame member of the door, a door leaf stop, or the ground. In the example shown in FIG. 1 the door leaf 12 is sized to completely block the opening 18 in a lower limit position of the door leaf 12. However, it is also possible that the door leaf 12 could block only a portion of the opening 18 (e.g. a lower portion of the opening 18) in its lower limit position, provided that said portion is sufficiently large to substantially block ingress or egress of animals through the opening 18. Similarly, in its upper limit position the door leaf 12 need not necessarily completely unblock the opening 12 as shown in FIG. 1. The door leaf 12 could block only a portion of the opening 18 (e.g. an upper portion of the opening 18) in its upper limit position, provided that said portion is sufficiently large to allow ingress or egress of animals through the opening 18.

A hoisting line is attached to an upper edge of the door leaf 12, in the form of a cord 22. A first end of the cord 22 is connected to an anchor point (not shown) on the door leaf 12. A second, opposing end of the cord 22 is connected to an anchor point 24 on a winch drum 26. The winch drum 26 is arranged to rotate about an axis R. Rotation of the winch drum 26 about the axis R in a first direction causes the cord 22 to be wound onto the winch drum 26, which in turn raises the door leaf 12 in the runners 14, 16. Rotation of the winch drum 26 about the axis R in a second, opposite direction causes the cord 22 to be unwound from the winch drum 26, which in turn lowers the door leaf 12 in the runners 14, 16. Rotation of the winch drum 26 about the axis R is effected by a hoisting line drive (e.g. a motor) operated by a drive controller 38. The drive controller 38 is coupled to a user interface with controls corresponding to initiation of the rotation of the winch drum 26 in the first direction (a 'raise door' command) and initiation of the rotation of the winch drum 26 in the second direction (a 'lower door' command) that may be operated by a user of the hoisting arrangement 10, or setting a timer or other conditions for automatic opening and closing.

A position sensing device in accordance with an embodiment of the invention is disposed between the door leaf 12 and the winch drum 26. The position sensing device comprises an actuator arm 28 arranged on a pivot 30. The actuator arm includes an aperture 32 and a resilient element 34. While the resilient element 34 is depicted as a coil spring in FIG. 1, any suitable resilient could be used in practice, including a leaf spring, rotational spring, resilient/deformable rubber elements, counterweights, etc. As a further alternative, the actuator arm 28 could itself be a resilient element biased to a particular configuration or position. A height indicator 40 is attached to the cord 22 between the door leaf 12 and the position sensing device. The height indicator 40 shown in FIG. 1 is releasably attached to the cord 22 so that it can be removed from the cord 22 and attached to the cord 22 at a different height. However, the height indicator 40 could alternatively be permanently affixed to the cord 22, or provided by a knot in the cord 22.

The position sensing device includes a proximity switch 35 which is arranged to detect an end 36 of the actuator arm 28 in a first position of the actuator arm 28. The proximity switch 35 could be a simple mechanical switch, an electronic sensor, a magnetic detector (e.g. Hall-effect sensor or reed switch sensor), an optical sensor, or any other suitable proximity switch known in the art. While the proximity switch 35 is arranged to detect an end 36 of the actuator arm 28 in the apparatus shown in FIG. 1, the proximity switch 35 could be arranged to detect any part of the actuator arm 28 in practice, or an element affixed thereto.

The position sensing device automatically terminates rotation of the winch drum 26 about the axis R, said rotation being in either the first or second direction, when it senses that the door leaf 12 reaches a predefined upper limit position or a predefined lower limit position. The operation of the position sensing device will be described in more detail with respect to FIGS. 2-4 below.

Figure 2:
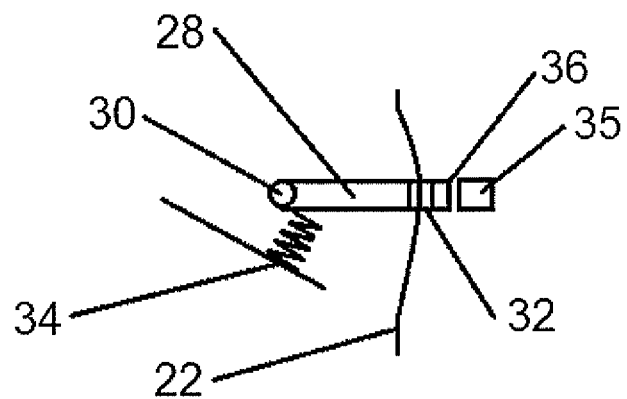
FIG. 2 schematically shows the actuator arm of FIG. 1 in a first position corresponding to a lower limit position of the door leaf.

FIG. 2 schematically shows the actuator arm 28 of FIG. 1 in a first position corresponding to a lower limit position of the door leaf 12. Like reference numerals have been retained where appropriate.

In FIG. 2 the door leaf 12 is in its lower limit position, covering the opening 18. In this position the door leaf 12 is supported on a floor surface. As a result, it exerts no force on the cord 22, and the cord 22 in turn exerts no significant force on the actuator arm 28. In this position of the door leaf 12 the cord 22 is slack, i.e. tension is relieved from the cord 22. The resilient element 34 urges the actuator arm 28 into a first position (i.e. the position shown in FIG. 2) in which the end 36 of the actuator arm 28 is sufficiently close to the proximity switch 35 so as to cause the proximity switch 35 to be in a first state. The position sensing device is configured so that the first state of the proximity switch 35 corresponds to deactivation of the hoisting line drive by the drive controller 38, and thereby termination of rotation of the winch drum 26 about the axis R. The drive controller 38 is configured such that, if it has been activated by a user with a 'lower door' command and the hoisting line drive is currently rotating the winch drum 26 about the axis R in the second direction when it receives the signal from the proximity switch 35, the drive controller 38 deactivates the hoisting line drive and so terminates rotation of the winch drum 26. This causes the cord 22 to stop moving.

Figure 3:
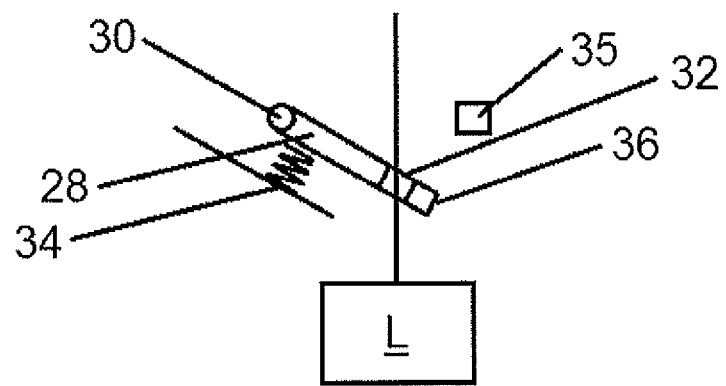
FIG. 3 schematically shows the actuator arm of FIG. 1 in a second position corresponding to an intermediate position of the door leaf.

FIG. 3 schematically shows the actuator arm of FIG. 1 in a second position corresponding to a position of the door leaf 12 intermediate the upper limit position and the lower limit position.

In FIG. 3, the door leaf 12 is in a position intermediate the upper limit position and the lower limit position. In this position, the door leaf 12 may be moving from one position to the other (either being raised or lowered) or the door leaf 12 may have been manually stopped in an intermediate position (e.g. by a user deactivating the hoisting line drive via the drive controller 38). In this position, the door leaf 12 is supported by the cord 22, and so the door leaf 12 represents a load L acting on the cord 22.

The load L takes up the slack in the cord 22 (see FIG. 2) and causes the cord 22 to be pulled taut between the winch drum 26 and the door leaf 12. The taut cord 22 is subject to a tension force equivalent to the load L acting along the longitudinal direction of the cord 22. The actuator arm 28 is configured to engage the hoisting line so as to deflect the hoisting line from its natural plumb line when in the first position in the absence of tension corresponding to a suspended load on the hoisting line. Accordingly, as the hoisting line moves from its lower limit position to an intermediate position and is subject to tension, a component of the tension force is imparted on the side of the aperture 32 of the actuator arm 28 against the force exerted by the resilient element 34. The resilient element 34 is calibrated so that the force exerted by the resilient element 34 can be overcome by the component of tension force provided by the weight of the door leaf 12 acting on the cord 22. During a door raising or lowering operation, the component of tension force overcomes the force exerted by the resilient element 34, and the actuator arm 28 rotates about the pivot 30. Said rotation of the actuator arm 28 causes the end 36 of the actuator arm 28 to move away from the proximity switch 35 to the second position.

In this position, the proximity switch 35 is in a second state where it does not detect the presence of the end 36 of the actuator arm 28. As a result, rotation of the winch drum 26 about the axis R continues until the door leaf reaches its upper or lower limit position.

Figure 4:
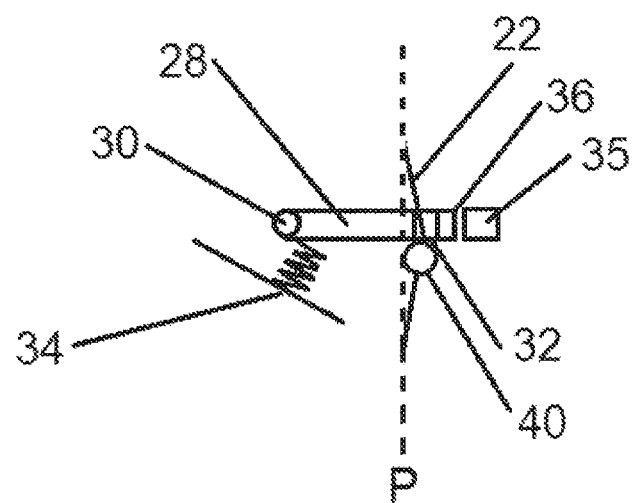
FIG. 4 schematically shows the actuator arm of FIG. 1 in the first position corresponding to an upper limit position of the door leaf.

FIG. 4 schematically shows the actuator arm 28 of FIG. 1 in the first position corresponding to the upper limit position of the door leaf 12.

In FIG. 4, the door leaf 12 is in its upper limit position. At this point, the cord 22 has been sufficiently wound around the winch drum 26 that the height marker 40 has travelled upwards towards the position sensing device and engages the actuator arm 28. The height marker 40 performs the function of an engagement portion (i.e. a part of the hoisting line, or an element affixed thereto, which is configured to engage an underside of the actuator arm).

The height marker 40 is sized so that it may not pass through the aperture 32 in the actuator arm 28 during raising of the door leaf 12. As a result, when the portion of the cord 22 on which the height marker 40 is provided reaches the aperture 32, the height marker 40 bears against an underside of the actuator arm 28. Further rotation of the winch drum 26 at this point causes the height marker 40 to exert a force on the actuator arm 28 to urge it into the first position as shown in FIG. 4. In this position, the end 36 of the actuator arm 28 is sufficiently close to the proximity switch 35 so as to cause the proximity switch 35 to be in its first state. As described above with respect to FIG. 2, the proximity switch 35 is configured to send a signal to the drive controller 38 to terminate rotation of the winch drum 26 about the axis R in this position. The drive controller 38 is configured such that, if it has been activated by a user with a 'raise door' command and the hoisting line drive is currently rotating the winch drum 26 about the axis R in the second direction when it receives the signal from the proximity switch 35, the drive controller 38 will deactivate the hoisting line drive and so terminate rotation of the winch drum 26.

In FIG. 4 it can be seen that in the upper limit position of the door leaf 12, the cord 22 is deflected from its natural plumb line path P. The natural plumb line path P is the pathway that the hoisting line would adopt under load in the absence of any outside forces, and is a vertical pathway in the embodiment shown in FIGS. 1-4. By comparison it can be seen that in FIG. 3 the cord 22 substantially aligns with the natural plumb line path P. This is because the resilient member 34 is configured so that the force that it provides to bias the actuator arm 28 towards its first position is overcome by the tension force in the cord 22 along the natural plumb line path P in the opposite direction. While the cord 22 is under load, the cord 22 is only deflected from the natural plumb line path P when the force provided by the resilient element 34 is supplemented by the force of the height marker 40 acting on the underside of the actuator arm 28. This allows the actuator arm 28 to return to its first position.

The position of the height marker 40 on the cord 22 may be varied to move the location of the upper limit position of the door leaf 12 as appropriate.

Figure 5:
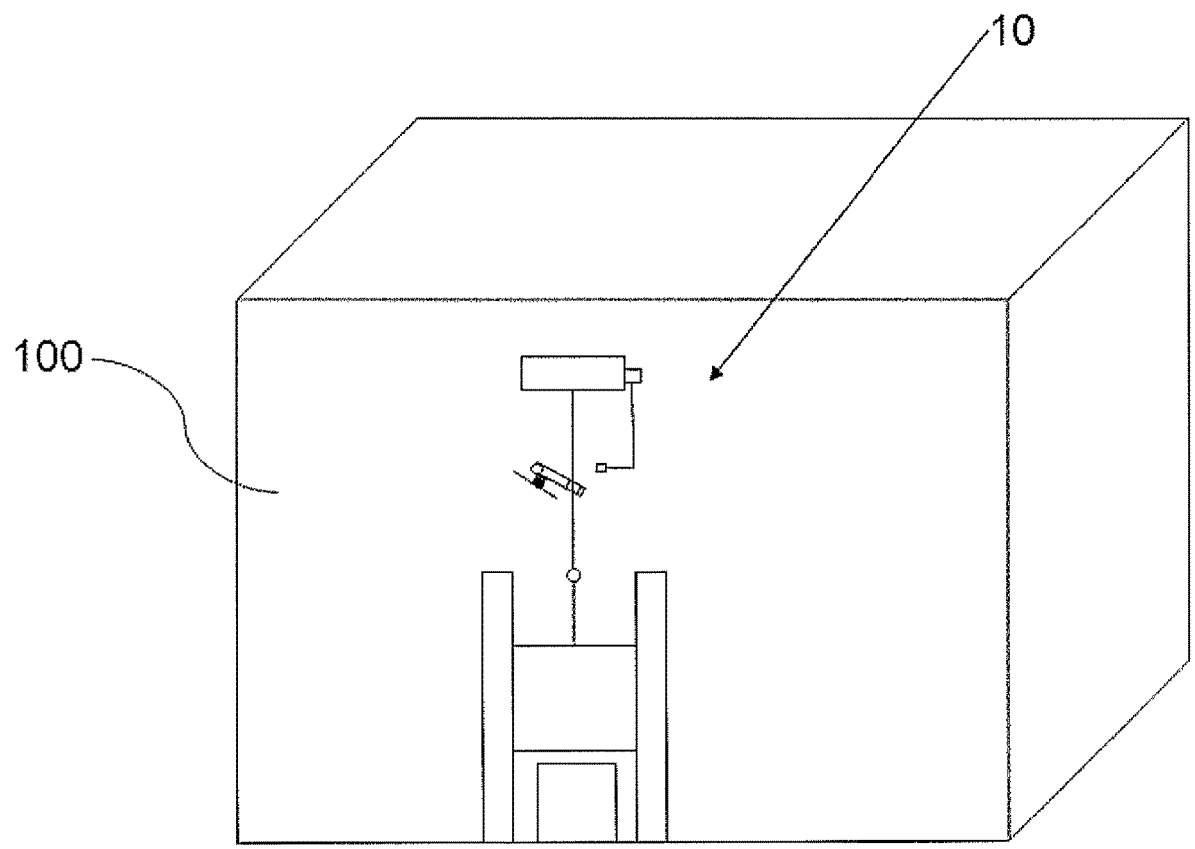
FIG. 5 schematically shows an animal enclosure incorporating the hoisting arrangement of FIG. 1.

FIG. 5 schematically shows an animal enclosure 100 incorporating the hoisting arrangement 10 of FIG. 1. The animal enclosure 100 comprises four walls which are joined to each other at their lateral sides to form a perimeter suitable for the containment of animals. The opening 18 of the hoisting arrangement 10 is an opening through one of the walls of the animal enclosure 100.

While a specific embodiment of the invention has been described above for the purpose of illustration, it will be appreciated that the invention is not so limited, and various alternatives and modifications will be apparent to a person skilled in the art without departing from the scope of the invention.

For example, while the invention has been developed during research in the field of animal enclosures, the position sensing device of the present invention has broad applicability in any field in which loads are hoisted between a first position and a second position. Examples of suitable fields includes cranes, elevators and other suspended platforms, suspended booms or gantries, sails, flags, winches and hoists.

While the embodiment described uses a cord anchored to a winch drum, the invention may be applied to any mechanism in which a hoisting line is raised and lowered from a mechanism. For example, a linear actuator could be used to raise or lower the hoisting line rather than a rotational mechanism.

While the embodiment described uses an actuator arm arranged on a pivot, this need not be the case and other arrangements may be used in practice. For example, the actuator arm could be linearly displaced between a first position in which it activates the proximity switch and a second position in which it does not activate the proximity switch.

While the actuator arm has been depicted in FIGS. 2 and 4 as being biased into a first position that is horizontal (i.e. angled perpendicularly to the natural plumb line path of the hoisting line), it has been found in practice that it is preferable to bias the actuator arm into a first position which is angled at approximately 25° (or greater) downwards from a horizontal position. This increases the component of the tension in the hoisting line that acts in opposition to the bias, which ensures that the actuator arm is reliably driven towards the second position.

While the actuator arm comprises an aperture, it could alternatively comprise a groove or recess in the end of the arm.

In some embodiments, the height marker could be omitted entirely and its function as an engagement portion could be replaced by contact of an upper surface of the door leaf itself (or any other load suspended from the end of the hoisting line) with an underside of the actuator arm. Alternatively, the hoisting line could be knotted with a knot of sufficient size so as to be unable to pass through an aperture/groove/recess in the actuator arm. In this case, part of the hoisting line itself would form the engagement portion, arranged to move the actuator arm into the first position in an upper limit position of the hoisting line. Further alternatives for the engagement portion include a thickened section of the hoisting line, or an enlarged segment where the hoisting line comprises a plurality of interconnected segments (e.g. a chain).

While the proximity switch is shown being electrically coupled to the motor through a wired connection, any suitable communication channel may be used in practice. For example, wireless internet, Bluetooth® protocol, radio signals, etc. Further, while the proximity switch is described as having a first state in which it sends a deactivation signal to the drive controller and a second state where it does not, this could easily be reversed in practice, i.e. the drive controller uses the absence of a signal from the proximity switch to effect deactivation of the hoisting line drive.

While the above embodiment describes the sensing of upper and lower limit positions of the door leaf it should be appreciated that this is intended to be used interchangeably with upper and lower limit positions of the hoisting line, as the two naturally correspond to one another. In particular, the invention will still function without a load suspended on the end of the hoisting line, provided that the hoisting line itself is sufficiently heavy to exert a component of tension force on the actuator arm between the upper and lower limit positions.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, "X includes at least one of A and B" is intended to mean any of the natural inclusive permutations. That is, if X includes A; X includes B; or X includes both A and B, then "X includes at least one of A and B" is satisfied under any of the foregoing instances. The articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment, aspect or implementation unless described as such.

While the present disclosure has been described in connection with certain embodiments and measurements, it is to be understood that the present disclosure is not to be limited to the disclosed embodiments and measurements but, on the contrary, is intended to cover various modifications and equivalent arrangements included within the scope of the appended claims, which scope is to be accorded the broadest interpretation so as to encompass all such modifications and equivalent structures as is permitted under the law.

The invention claimed is:

1. A position sensing device for sensing an upper limit position and a lower limit position of a hoisting line, the hoisting line for raising and lowering a moveable suspended load, the position sensing device comprising:
   a hoisting line pathway adapted to receive the hoisting line to raise and lower the moveable suspended load;
   an actuator arm moveable between a first position and a second position, the actuator arm biased to the first position;
   a proximity switch having a first state corresponding to the actuator arm being in the first position and a second state corresponding to the actuator arm being in the second position, the actuator arm adapted to cooperate with the hoisting line received along the hoisting line pathway, such that when the hoisting line is in an intermediate position between the lower limit position and the upper limit position and is under tension corresponding to the moveable suspended load, the hoisting line bears against a portion of the actuator arm to move the actuator arm to the second position, the actuator arm adapted so that when tension corresponding to the moveable suspended load is relieved from the hoisting line in its lower limit position, the actuator arm moves under bias to the first position; and
   the actuator arm further adapted to cooperate with an engagement portion on the hoisting line as the hoisting line rises towards its upper limit position to move the actuator arm into the first position when the hoisting line reaches its upper limit position.

2. The position sensing device according to claim 1, wherein the actuator arm is adapted to pivot between the first position and the second position.

3. The position sensing device according to claim 1, wherein the actuator arm comprises at least one of an aperture, groove and slot adapted to receive the hoisting line to bear against the actuator arm.

4. The position sensing device according to claim 1, wherein the proximity switch comprises one of: a mechanical switch, an electronic sensor, a magnetic detector and an optical sensor.

5. A hoisting arrangement comprising:
   a position sensing device for sensing an upper limit position and a lower limit position of a hoisting line for raising and lowering a moveable suspended load, the position sensing device comprising:
      a hoisting line pathway adapted to receive the hoisting line to raise and lower the moveable suspended load;
      an actuator arm moveable between a first position and a second position, the actuator arm biased to the first position;
      a proximity switch having a first state corresponding to the actuator arm being in the first position and a second state corresponding to the actuator arm being in the second position, the actuator arm adapted to cooperate with the hoisting line received along the hoisting line pathway, such that when the hoisting line is in an intermediate position between the lower limit position and the upper limit position and is under tension corresponding to the moveable suspended load, the hoisting line bears against a portion of the actuator arm to move the actuator arm to the second position,
      the actuator arm adapted so that when tension corresponding to the moveable suspended load is relieved from the hoisting line in its lower limit position, the actuator arm moves under bias to the first position; and
      the actuator arm further adapted to cooperate with an engagement portion on the hoisting line as the hoisting line rises towards its upper limit position to move the actuator arm into the first position when the hoisting line is in its upper limit position; and
   a hoisting line drive adapted to raise and lower the hoisting line received along the hoisting line pathway to cooperate with the actuator arm.

6. The hoisting arrangement according to claim 5, further comprising a drive controller for stopping the hoisting line drive when the proximity switch is in its first state.

7. The hoisting arrangement according to claim 5, wherein the hoisting line is received along the hoisting line pathway.

8. The hoisting arrangement according to claim 5, wherein the actuator arm is adapted to deflect the hoisting line from a natural plumb line path of the hoisting line when the actuator is in the first position, such that as the hoisting line moves from the lower limit position to an intermediate position between the lower limit position and the upper limit position, tension in the hoisting line corresponding to a suspended load drives the actuator arm towards the second position.

9. The hoisting arrangement according to claim 7, wherein the engagement portion is provided by at least one of a knot formed in the hoisting line and a load suspended on the hoisting line.

10. The hoisting arrangement according to claim 5, wherein the actuator arm comprises at least one of an aperture, groove and slot adapted to receive the hoisting line to bear against the actuator arm, and wherein the engagement portion is sized so as to be too large to pass through at least one of the aperture, groove and slot.

11. The hoisting arrangement according to claim 7, wherein the engagement portion is provided by a height marker attached to the hoisting line.

12. The hoisting arrangement according to claim 11, wherein the height marker is adapted to be attached to the hoisting line at any of a plurality of different points corresponding to different predefined upper limits of the hoisting line.

13. The hoisting arrangement according to claim 7, further comprising:
- an opening in a wall; and
- a door leaf suspended by the hoisting line, wherein the door leaf is moveable between a closed position corresponding to the lower limit position of the hoisting line and in which it is supported to remove a tension load on the hoisting line, and an open position corresponding to the upper limit position of the hoisting line.

14. An animal enclosure comprising:
a hoisting arrangement comprising:
- a position sensing device for sensing an upper limit position and a lower limit position of a hoisting line for raising and lowering a moveable suspended load, the position sensing device comprising:
  - a hoisting line pathway adapted to receive the hoisting line to raise and lower the moveable suspended load;
  - an actuator arm moveable between a first position and a second position, the actuator arm biased to the first position;
  - a proximity switch having a first state corresponding to the actuator arm being in the first position and a second state corresponding to the actuator arm being in the second position, the actuator arm adapted to cooperate with the hoisting line received along the hoisting line pathway, such that when the hoisting line is in an intermediate position between the lower limit position and the upper limit position and is under tension corresponding to the moveable suspended load, the hoisting line bears against a portion of the actuator arm to move the actuator arm to the second position,
  - the actuator arm adapted so that when tension corresponding to the moveable suspended load is relieved from the hoisting line in its lower limit position, the actuator arm moves under bias to the first position, and
  - the actuator arm further adapted to cooperate with an engagement portion on the hoisting line as the hoisting line rises towards its upper limit position to move the actuator arm into the first position when the hoisting line is in its upper limit position;
- a hoisting line drive adapted to raise and lower the hoisting line received along the hoisting line pathway to cooperate with the actuator arm;
- a hoisting line received along the hoisting line pathway;
an opening in a wall; and
a door leaf suspended by the hoisting line, wherein the door leaf is moveable between a closed position corresponding to the lower limit position of the hoisting line and in which it is supported to remove a tension load on the hoisting line, and an open position corresponding to the upper limit position of the hoisting line.

15. A method of sensing upper and lower limit positions of a hoisting line, using a hoisting arrangement comprising:
- a position sensing device for sensing an upper limit position and a lower limit position of a hoisting line for raising and lowering a moveable suspended load, the position sensing device comprising:
  - a hoisting line pathway adapted to receive the hoisting line to raise and lower the moveable suspended load;
  - an actuator arm moveable between a first position and a second position, the actuator arm biased to the first position;
  - a proximity switch having a first state corresponding to the actuator arm being in the first position and a second state corresponding to the actuator arm being in the second position, the actuator arm adapted to cooperate with the hoisting line received along the hoisting line pathway, such that when the hoisting line is in an intermediate position between the lower limit position and the upper limit position and is under tension corresponding to the moveable suspended load, the hoisting line bears against a portion of the actuator arm to move the actuator arm to the second position,
  - the actuator arm adapted so that when tension corresponding to the moveable suspended load is relieved from the hoisting line in its lower limit position, the actuator arm moves under bias to the first position, and
  - the actuator arm further adapted to cooperate with an engagement portion on the hoisting line as the hoisting line rises towards its upper limit position to move the actuator arm into the first position when the hoisting line is in its upper limit position;
- a hoisting line drive adapted to raise and lower the hoisting line received along the hoisting line pathway to cooperate with the actuator arm, and
- a hoisting line received along the hoisting line pathway,
the method comprising:
lowering the hoisting line from the upper limit position providing a tension load in the hoisting line moving the actuator arm to the second position;
lowering the hoisting line to the lower limit position providing removal of the tension load in the hoisting line and moving the actuator arm to the first position; and
raising the hoisting line to the upper limit position providing tension in the hoisting line and a physical bulge in the hoisting line moving the actuator arm to the first position.

16. The method of claim 15, wherein:
the moveable suspended load is a door of an animal enclosure.

* * * * *